United States Patent [19]

Plaot

[11] Patent Number: 4,690,485
[45] Date of Patent: Sep. 1, 1987

[54] FLAT BED OPTICAL SCANNING BEAM DEFLECTION SYSTEM

[75] Inventor: Michael Plaot, Eschborn, Fed. Rep. of Germany

[73] Assignee: Allied Corporation, Morris Township, Morris County, N.J.

[21] Appl. No.: 778,585

[22] Filed: Sep. 20, 1985

[30] Foreign Application Priority Data

Sep. 22, 1984 [DE] Fed. Rep. of Germany ........ 3434841

[51] Int. Cl.$^4$ .............................................. G02B 26/10
[52] U.S. Cl. ....................................... 350/6.5; 350/6.9
[58] Field of Search .................................. 350/6.5–6.9

[56] References Cited

U.S. PATENT DOCUMENTS

| 3,667,360 | 6/1972 | Vicik | 350/6.7 |
| 3,870,394 | 3/1975 | Ploeckl | 350/6.8 |
| 4,154,507 | 5/1979 | Barr | 350/6.9 |

*Primary Examiner*—John K. Corbin
*Assistant Examiner*—Loha Ben
*Attorney, Agent, or Firm*—A. Jose Cortina; W. F. Thornton

[57] ABSTRACT

An optical flat bed deflection system comprises at least one rotating active reflective face (6) for deflecting a beam of parallel rays (1) along a deflection or scan line in a planar deflection plane (15), and an imaging optical system, i.e., an fθ lens arrangement, interposed between the active reflective face and the deflection plane. In order to reduce the disturbing influence of the bearing wobbling during rotation, on the image, a reverse-telescope like optical system is provided in front of the imaging optical system for enlarging one exit angle of the active reflective faces. In connection therewith, only two rotating active reflective faces are provided, each one of which is provided as a prism.

15 Claims, 3 Drawing Figures

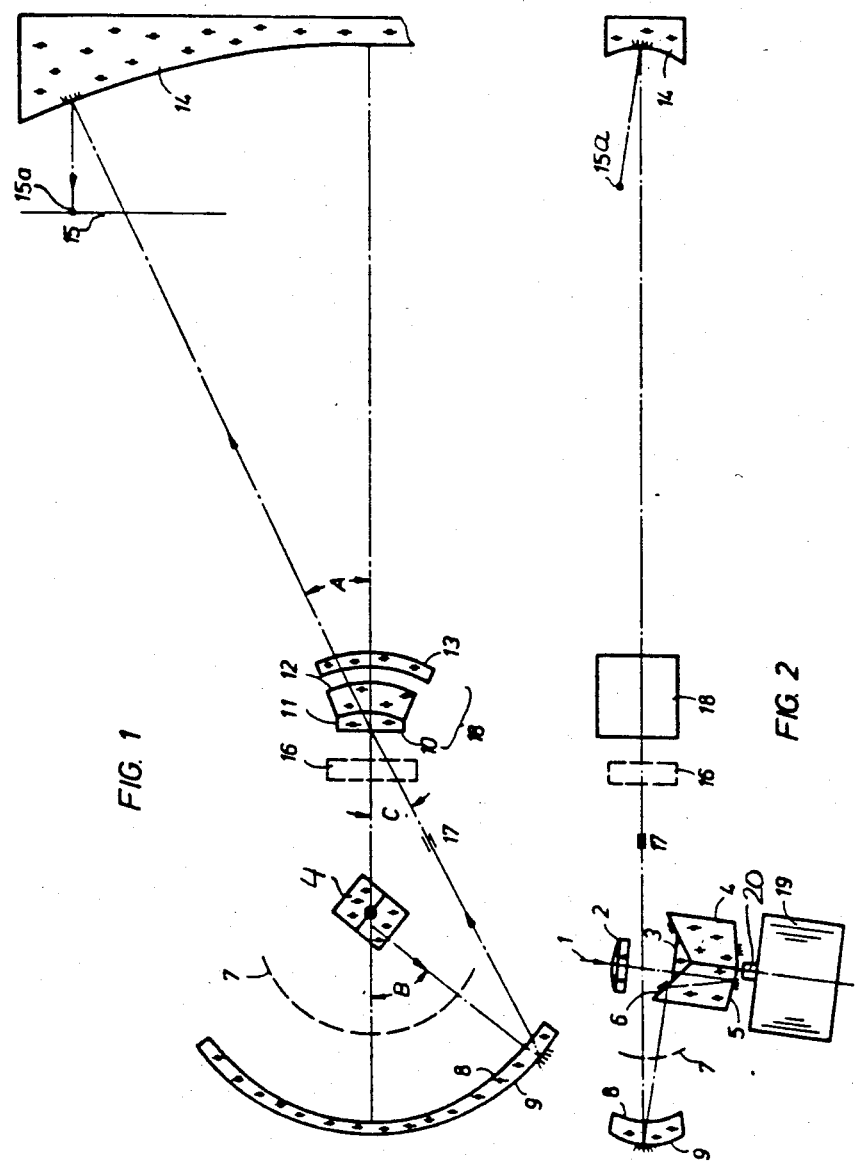

FLAT BED OPTICAL SCANNING BEAM DEFLECTION SYSTEM

BACKGROUND OF THE INVENTION

This invention relates to a flat bed optical scanning beam deflection system, e.g., for use with a source of collimated light such as a laser, of the type wherein a beam of light, which is switched on and off as function of a pixel frequency, is projected by means of a rotating reflective element to create an image. More particularly, such prior art deflection systems are used as either an input scanner or an output scanner in various applications.

In a preferred application, the system of the present invention is employed in the typesetting of typographic characters by means of a light beam of parallel rays of light, i.e., a collimated beam, which is modulated as a function of the pixel frequency, and corresponding to image spots. In general, such flat bed deflection systems are employed to move or deflect a spatially fixed collimated light beam, hereinafter "light beam", in the direction of a scan line in a planar deflection plane which is perpendicular to the light beam, in a way such that independently from the position of the increment in the scan line, an equally long deflection path increment corresponds to each pixel period. In the flat bed deflection system of the type discussed above, which includes a rotatable or tiltable reflective member, this results in each angle of rotation corresponding to a predetermined proportional distance of scan in the deflection plane. Further, constant spacings are provided between consecutive scan lines in the perpendicular direction with respect to said scan lines.

Prior art flat bed laser scan or write systems consist of a laser, a beam expander (i.e. a telescopic system), a beam deflector in the form of a galvanometer with attached mirror, or a rotating reflecting polygon followed by a so called fθ objective. The latter objective has its entrance pupil on the deflecting mirror, and is designed with distortion so that the angular deflection of the scanning mirror is linearly proportional to the tangential movement of the beam in the image plane.

However, it has been found that a number of possibilities for error exists in such systems due to limitations with respect to manufacturing tolerances in the production of such flat bed deflection systems. One especially common cause of error is caused by the bearing on which the rotatable or tiltable face of the reflective member or element is supported. More particularly, when certain tolerances are exceeded in the manufacture of the bearing, it will tend to wobble causing what is known as polygon pyramidal error. In these systems, when the reflective member is a polygon having a plurality of reflective faces staggered relative to each other, such wobble will disturb the relationship between consecutive deflection lines, (i.e., the polygon pyramidal error will manifest itself as a result of the angular deviation of each reflective face of the polygon relative to a reference face thereof).

Accordingly, in order to effect the deflection in a manner such that the scan line is substantially precisely maintained within a single planar deflection plane, which is particularly desirable when the device is employed in typographic applications considering that in such application even minute irregularities will be noticeable, it becomes necessary to strive for a deflection angle which is as large as possible. More specifically, by increasing the deflection angle for a predetermined deflection angle, the optically effective distance or arm between the rotatable or tiltable reflective face and the deflection plane is correspondingly reduced. Thus, irregularities in the movement and position of the reflective face, for instance of a polygonal reflective member do not manifest themselves in as pronounced a manner within a particular deflection plane.

The exact positioning of an image spot along the lines in the image plane is also desirable in order to be able to determine the position of the image through the use of a conventional and relatively simple rotation sensor connected to the rotatable active reflective faces. Otherwise, extensive measurements through the use of a screen ruler in the image plane, and by measuring of the beam correspondingly deflected as a result of the modulated beam transferred through the associated optical system, which images a movable image spot of the measured beam on a photo receiver, becomes necessary.

In the prior art flat bed deflection systems, the angle of deflection is restricted within predetermined limits along a perpendicular line on the film plane because the image spot must not be imaged at too large a size since to do so will cause the image at the edges to become increasingly ellipse-shaped. In such typical prior art optical flat bed deflection systems, the optical system arranged between the rotatable or tiltable reflective face, and the deflection plane for deflecting a light beam through the various deflection positions in the deflection plane is comprised of a flat field lens in combination with multiple other members, resulting in an expensive arrangement. These lenses, which are employed in these conventional prior art systems, are also generally referred to as fθ lenses. It is however a disadvantage of these fθ lenses that they may be employed for use in situations where the deflection angle is highly limited in size, preferably in case where high resolution is desired, such as in a typographic typesetting apparatus. The entrance angle of such lens systems is also correspondingly highly limited in size.

In order to enlarge the entrance angle of such linearising optical systems, it has been previously suggested to provide an optical system which includes an aplanatic lens, i.e., a lens which is corrected for spherical aberration, including a first approximately planar face facing the rotating active reflective face and a second sperically-convex face facing the scan line plane, i.e., the image plane, such that the main beam will, at any angle of deflection, essentially impinge upon the lens as well as on a field flattening mirror near the deflection plane. Such a system is generally disclosed in German Patent Application No. P 34 04 407.8 whose disclosure is specifically incorporated by reference herein.

SUMMARY OF THE INVENTION

Accordingly, it is one object of the present invention to further enlarge, by different means, the angle of rotation per line length of the active reflective face in order to maintain the distorting influence of the line tumble, for a given line length in the deflection plane, or in the image plane respectively, as low as possible.

This and other objects of the invention will become more readily apparent from the following discussion.

In accordance with the invention, there is provided a beam deflection system which includes a rotatable reflective element having plural reflective faces, in combination with an imaging system. The invention is characterized in that optical means is provided at a position in the light path before the imaging system for providing an increased entrance angle of the light into the imaging system.

In a more specific aspect the optical means comprises a reverse-telescope optical system. More particularly, the reverse-telescope optical system is preferably a concave shaped mirror of the type generally referred to as a Mangin mirror which is well known to those of ordinary skill in the art.

Generally, a telescope is an optical system with an input of principally parallel beams from different distant targets. At the output are again parallel beams. The angle representative of the change in light path between the targets is enlarged by the factor of magnification of the telescope.

In a reverse telescope is the angle representative of the change in light path reduced according to the magnification. Mangin mirrors are discussed in the book of Rudolf Kingslake "Lens Design Fundamentals", New York, 1978, page 309.

In accordance with the invention, by using the reverse-telescope optical system, without other extensive changes of the overall optical system, the usable angle of rotation of an active reflective face, or the exit angle of the reflective face, which is equal to the entrance angle of the system, is increased to such an extent that an angle of rotation of approximately 130° per line may be used. This directly results in a substantial reduction in the undesirable line tumble throughout the deflection plane because of its relationship to the angle of rotation of the active reflective face. Generally the reduction of angular line tumble is equivalent to the ratio of the usable angle of rotation to the effective optical write angle in the deflection plane.

One advantage of the resultant large angle of rotation is that the system instead of requiring a multi-face polygon will only require two rotating reflective bodies, each provided in a manner which is insensitive to tilting in accordance with the pentaprism principle. The pentaprism principle means that the relation between input angle to the beam output angle is independent of the rotation of the prism. See publication of Karl Mutze "ABC der Optik", Leipzig, 1961, page 738.

The reflective bodies which are constructed in accordance with the pentaprism principle each include one reflective face through which an impinging light beam, i.e., a collimated beam, is back-reflected to an active reflective face which is inclined at about 45° angle relative to the first-mentioned reflective face, and which transmits the beam through the imaging optical system. The exit angle at which the beam emanates from the active reflective face is thus practically independent from the entrance angle of the beam into the prism and thus, relatively insensitive to tilting. There is always a beam deflection of about 90° between the entrance beam and the exit beam of the active reflective face. Line tumble over the angle of rotation of this active reflective face is thus practically eliminated. By production of two reflective bodies, for example, by simple polishing, which are relatively insensitive to tilting, and which are integrated into the deflection system, relatively rough tolerances are allowed in the manufacture and at the same time an identical angle of deflection may be achieved for both active reflective faces. Further, because only two deflection lines are scanned per rotation of the two rotating active reflective faces, the rotation speed may substantially be increased as compared to the prior art thus leading again to a better synchronization of the operation of the system. The large angle of rotation of each active rotating reflective body permits the use of a relatively inexpensive position indicator coupled to the axis of rotation of the reflective element in lieu of a more complicated second optical system including a ruler in the plane of deflection for generating pixel clocks which are used for a beam modulator. Position indicators (incremental shaft encoders) are disclosed in the publication of Messrs. Heidenhain in Traunreuth "Inkrementale Drehgeber ROD/ERO".

In the flat bed deflection system according to the invention it is not absolutely necessary that an $f\theta$ lens system be used as the imaging optical system since a relatively small and simple imaging system (i.e. a lens system in which the tangent of the image angle is proportional to the tangent of the object angle) is sufficient.

For the formation of a compact flat bed deflection system, a telescope-like optical system is particularly advantageously obtained by employing a concave mirror, the focussing plane of which coincides with the intermediate image plane of the active reflective face of the reflective element reflecting the respective beam, and with a focussing lens provided in the path of light transmitted to the reflective element. Because of the rotational movement of the active reflective face, an intermediate image plane of the focussing lens is configured also in a circular arc.

A particularly advantageous arrangement of the two prism reflective element which is not sensitive to tilting is provided by having the two reflective bodies, together with the right prism partly covering it, form a compact unit to be produced at relatively little costs. The manufacture of such an element is effected in a conventional manner well known to those of ordinary skill in the art.

It is particularly advantageous as previously discussed, to employ a Mangin mirror as the concave mirror. The beam deflection on the Mangin mirror is such that about half of the beam impinges on the concave mirror and the remaining half on the corresponding lens thereof. By means of the Mangin mirror, the necessary corrections on the optical system are simplified. The imaging optical system according to the invention may suitably comprise an $f\theta$ lens arrangement and a field flattening concave mirror. Between the $f\theta$ lens arrangement and the concave mirror a predetermined small spacing is provided over the large angle of deflection.

The $f\theta$ lens arrangement is, in a preferred embodiment, comprised of a main member which includes a lens made of low-refracting glass, type BK7 with refractive index of 1.515 having a front plane face and a beam concentric convex face. A lens of high refracting glass, type SF14 with refractive index of 1.756 is cemented to the beam concentric convex face, which lens also has a beam-concentric outer face. By high refracting glass is meant a glass having an index of refraction of 1.62 to 1.8; by low refracting glass is meant a glass having an index of refraction of 1.49 to 1.63. The $f\theta$ lens arrangement and particularly the front plane face may be kept small because the flat bed deflection system according to the invention forms, at the front plane face, a focussing point.

The $f\theta$ lens arrangement may be further supplemented by an uncemented negative dispersion lens positioned after it, with respect to the light path, to obtain a further correction, especially in case of a distortion overcorrection on the plane face of the fθ lens arrangement.

BRIEF DESCRIPTION OF THE DRAWINGS

In the following specification and claims the invention will be described in greater detail made with reference to the drawings wherein:

FIG. 1 is a schematic diagram of the flat bed deflection system in accordance with the invention viewed from below, without showing the drive motor thereof;

FIG. 2 is a schematic view from the side of the flat bed deflection system according to FIG. 1.

DETAILED DESCRIPTION OF THE INVENTION

Figure 3:
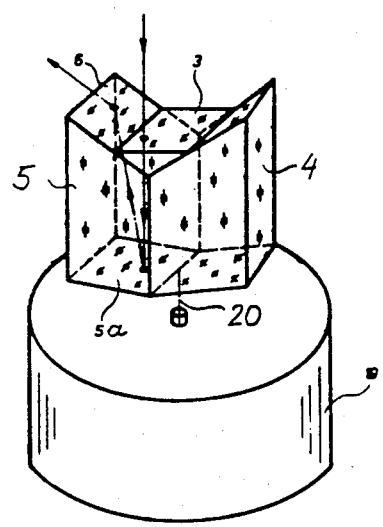
FIG. 3 shows in greater detail the flat bed deflection system according to FIGS. 1 and 2, particularly the two prisms arrangement constructed for avoiding tilting effects during rotation thereof.

In accordance with FIG. 2, there is shown a light beam, typically a beam of parallel rays i.e., a collimated beam 1, preferably obtained from laser beam. In the path of this beam 1, a focussing lens 2 is provided which serves to direct the beam 1 in parallel to and near an axis of rotation 20, of a drive motor which includes bearing 19 connected to one of two prisms 4 and 5 which are not sensitive to tilting, as previously discussed. The prisms 4 and 5 are cemented to each other in a side by side arrangement and are generally referred to as reflective bodies.

The specific structure of the two prisms 4 and 5 is more specifically illustrated in FIG. 3. These prisms 4 and 5 are rotatable by means of a drive motor (not shown) connected to bearing 19 about axis 20. The motor arrangement is conventional and well known to those of ordinary skill in the art.

From FIG. 3, it can be more clearly seen how the two prisms 4 and 5 are arranged essentially in parallel relative to axis of rotation 20. Each of the two prisms 4 and 5 includes an upper active reflective face, for instance face 6, facing a second like reflective face at an angle of about 45°. The second reflective face, for instance 5a, is inclined relative to the horizontal at an angle of about 5°. The upper two active reflective faces of the two prisms are partly covered by a right third prism 3 which includes a horizontal face oriented perpendicularly to beam 1 and which serves as an entrance face to the prisms 4 and 5. Thus, the beam 1 passes through prism 3, through active reflective face 6 to reflective face 5a, is then back-reflected from it to the interior of active reflective face 6, and emerges from it at about a right angle relative to the entering beam 1 from the light source, i.e., laser.

Each of the two active reflective faces has an angle of rotation, or exit half angle B. The exit beam is directed, preferably to a Mangin mirror as previously discussed, having a negative lens 8 over a concave mirror 9 as shown. Due to the rotational movement of the active reflective faces, an intermediate image plane of the focussing lens 2 lies on an arc. The focussing line coincides with the focussing plane of the Mangin mirror and is referred to as 7. The focussing plane is the curved plane on which parallel light at different angles have their focussing points.

In the present case, the beam deflection on the Mangin mirror is designed to amount to about 25°, about half of which is provided for concave mirror 9 and half of it for negative lens 8. The Mangin mirror generates a convergence point on a planar front face 10 of an fθ lens arrangement 18. The fθ lens arrangement, which is constructed in a conventional manner, comprises a main member having a planar front face 10 and a beam-concentric convex face 11.

The arrangement includes the main member as a lens of low-refractive glass as previously defined. Cemented to this lens is another lens, in this case of high-refractive glass, having a convex beam-concentric exit face 12. The fθ lens arrangement includes spaced therefrom an uncemented negative diverging lens 13, which functions to correct any distortion overcorrection on planar face 10.

The distortion correction for a fθ function, i.e. rotation angle to tangent proportionality, can be achieved by having the angular mirror deviation transferred into a sine function and by proper choice of relative angles, i.e. of the refracted angles and the angles forming the image plane. Overcorrection may be due to unavailibility of glass of lens 11 with appropriate index of refraction.

The image aberration correction of the whole system may be totally provided by the fθ lens arrangement or alternatively, by the reverse-telescope system. This image aberration correction may be achieved according to methods published in the book of Rudolf Kingslake "Lens Design Fundamentals", New York, 1978.

The reverse-telescope system includes focussing lens 2, the respective active reflective faces as well as the Mangin mirror.

Finally, the fθ lens arrangement also includes a field flattening concave mirror 14 interposed in the light path between a planar image plane 15 and the lenses having faces 10, 11 and 12. The field flattening mirror 14 shortens the beam path between the lenses mentioned and the planar image plane 15.

For each usable position of one of the active reflective faces, each having an angle of rotation of for example 130° per line, an image spot 15a is imaged, which is practically distortion-free, i.e. the line length in the image plane 15 is proportional to the angle of rotation up to 0.1% error.

In FIGS. 1 and 2, it is shown at 17 that a collimated light beam emerges from the Mangin mirror in the direction of the fθ lens arrangement. By reference numeral 16, the position of additional or alternative correction members is shown, which members may be desired in a simpler optical system, i.e., in another embodiment. It is of advantage that sufficient space is available for such correction members 16 because the convergence point in the area of the planar face 10 is a large distance away with respect to the axis of rotation 20. Such correction members are disclosed in the book of Rudolf Kingslake "Lens Design Fundamentals", New York, 1978.

In particular, a planar concave lens may be provided as correction member 16 upon which impinges the beam 17, and which corrects distortion in the system in a manner such that concave mirror 14 of optical system 18 may be eliminated while at the same time a distortion-free image is generated on image plane 15. Because one concave side of planar concave lens 16 is concentric relative to a point of intersection of parallel beam bundle 17, the generated virtual image can be free from astigmatism and coma.

In an advantageous further embodiment, a so-called modified Steinheil periscope may be provided as imaging optical system 18 which images the virfual image in a concave image shell generated by a planar concave lens 16 onto planar image plane 15. Such a Steinheil periscope is disclosed in the book of Rudolf Kingslake "Lens Design Fundamentals", New York, 1978, page 217.

Astigmatism in the imaging optical system 18 may, finally, in another simple way be corrected in a manner such that a deviation from parallelism of the parallel rays, i.e., collimated beam is adjusted.

By means of the further developments according to the invention, field flattening concave mirror 14 may thus be eliminated. More specifically, in this case the lens 16 is a concave lens 16 having one plane face which corrects for distortion in the $f\theta$ lens arrangement in a manner such that a distortion free image is provided in the image plane 15. The optical system may, as a whole, be made distortion-free at substantially less costs.

In general, the present invention permits the exploitation of a large effective angle of rotation of the two tilt-insensitive reflective bodies. As only two reflective bodies are necessary, their outward extension from the axis of rotation may be kept small from which further advantages may be derived, particularly small centrifugal forces.

While there has been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. In an optical laser beam deflection system of the type including rotating active reflective faces for generating a light scan, in combination with an imaging system for imaging, the improvement comprising optical means (2-8) provided in the light path before the imaging system (18) for enlarging the entrance angle (C) of the imaging system, and wherein not more than two rotating reflective bodies (4.5) are provided which are arranged in a pentaprism structure, each with one active reflective face, to thereby obviate effects of tilting relative to inclinations of the axis of rotation (20) during rotation thereof, and said bodies being positioned in the light path before said optical means.

2. A deflection system as in claim 1, wherein a fixed focussing lens (2) for generating together with one each of said reflective bodies (4, 5) a concavely curved intermediate image plane (7), and a concave mirror (9) are positioned in the beam path of the optical means (2-8) at a position such that the focussing plane of said lens (2) and bodies (4, 5) coincides with said intermediate image plane (7).

3. A deflection system as in claim 1, wherein the reflective bodies (4, 5) are arranged side by side essentially parallel with respect to the axis of rotation (20) thereof each having an active reflective face to make up two active reflective faces, a right prism (3) partly covering, on the outside, and two active reflective faces, is positioned for having a beam of light impinge thereon when directed essentially in parallel to the axis of rotation of said bodies (4, 5), on a face thereof perpendicular to the axis of rotation.

4. A deflection system as in claim 1 wherein the reflective bodies (4, 5) are arranged side by side essentially parallel with respect to axis of rotation (20) thereof, a right prism (3) partly covering, on the outside, said two active reflective faces is positioned for having a beam of light impinge thereon when directed essentially in parallel to the axis of rotation of said bodies (4, 5), on a face thereof perpendicular to the axis of rotation.

5. A deflection system as in claim 2 wherein the reflective bodies (4, 5) are arranged side by side essentially parallel with respect to axis of rotation (20) thereof, a right prism (3) partly covering, on the outside, said two active reflective faces, is positioned for having a beam of light impinge thereon when directed essentially in parallel to the axis of rotation of said bodies (4, 5), on a face thereof perpendicular to the axis of rotation.

6. A deflection system as in claim 1 further comprising means for creating an image on a planar image plane (15), which means comprises an $f\theta$ lens arrangement (18) and a field flattening concave mirror (14) provided between said $f\theta$ lens (18) and said planar image plane (15).

7. A deflection system as in claim 2 further comprising means for creating an image on a planar image plane (15), which means comprises an $f\theta$ lens arrangement (18) and a field flattening concave mirror (14) provided between said $f\theta$ lens (18) and said planar image plane (15).

8. A deflection system as in claim 3 further comprising means for creating an image on a planar image plane (15), which means comprises an $f\theta$ lens arrangement (18) and a field flattening concave mirror (14) provided between said $f\theta$ lens (18) and said planar image plane (15).

9. A deflection system as in claim 6, wherein said $f\theta$ lens arrangement (18) comprises a main member (10, 12) including a lens of a substantially low-refracting glass having a front plane face (10) and a beam-concentric convex face (11), a lens of substantially high-refracting glass having a beam-concentric outer face (12) and which is cemented to said beam-concentric face (11).

10. A deflection system as in claim 1 wherein each of said reflective bodies (4, 5) comprise, in addition to reflective face (5a), a further reflective face (6) facing the reflective face (5a) at an angle of about 45°.

11. A deflection system as in claim 1 further comprising a plane concave lens (16) positioned in the light path between said Mangin mirror (8, 9) and said $f\theta$ lens arrangement (18) such that a distortion-free image is provided in an image plane (15).

12. A deflection system as in claim 11 wherein one concave side of said plane concave lens (16) is concentric relative to one point of intersection of a beam of parallel rays (16).

13. A deflection system according to claim 11 wherein a modified Steinheil periscope is provided as an imaging system (18) for imaging a virtual image, generated by said plane concave lens (16) in a concave image shell, onto the image plane (15).

14. A deflection system as in claim 1 wherein, for correcting the astigmatism of said imaging system (18), means are provided to correct deviations from the parallel with respect to each other of a beam of parallel rays (17).

15. A deflection system as in claim 13 wherein, for correcting the astigmatism of said imaging system (18), means are provided to correct deviations from the parallel with respect to each other of a beam of parallel rays (17).

* * * * *